Dec. 5, 1939.  O. RASMUSSEN  2,182,237
MASTER CYLINDER
Filed March 31, 1937
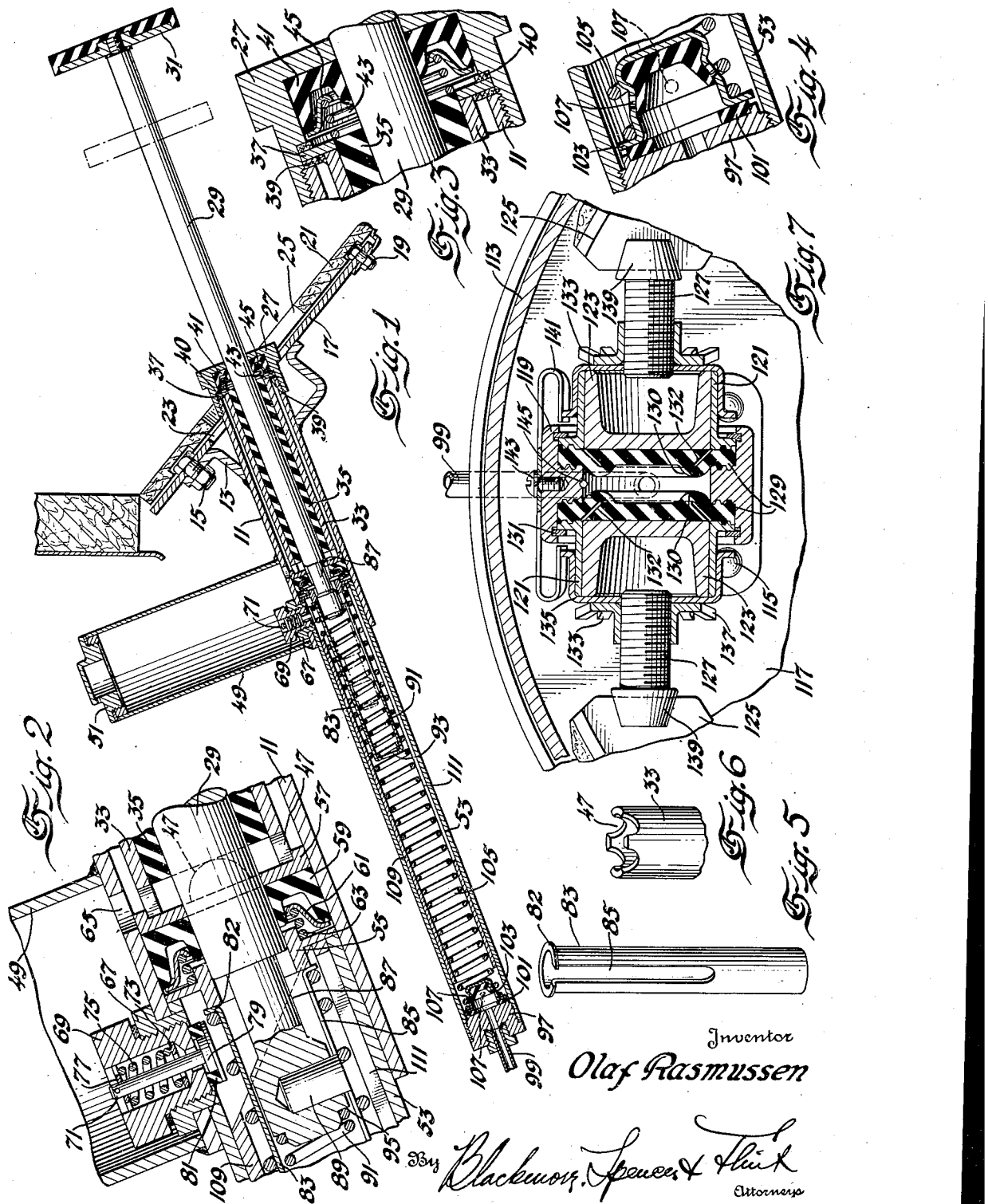
Inventor
Olaf Rasmussen
By Blackmore, Spencer & Fluit
Attorneys Patented Dec. 5, 1939

2,182,237

UNITED STATES PATENT OFFICE 2,182,237

MASTER CYLINDER

Olaf Rasmussen, Dayton, Ohio, assignor to General Motors Corporation, Detroit, Mich., a corporation of Delaware Application March 31, 1937, Serial No. 133,938

4 Claims. (Cl. 60—54.6)

This invention relates to hydraulic operating systems such as are used for applying brakes or releasing clutches on motor vehicles. In such systems there is employed a master cylinder, a wheel cylinder (when the system is used for applying brakes) and a conduit connecting said cylinders.

The present invention involves an improvement in the master cylinder, having among its objects a simplified method by which the piston element is moved by the foot of the operator, a double spring arrangement whereby two springs are progressively compressed to the end of preventing a rapid build up of spring compression force at the end of the piston stroke, and having the further object of reducing the length of the master cylinder.

The invention also has a further object, an improvement in the connection between the master cylinder and the reservoir. An improved wheel cylinder is also disclosed herein.

In the accompanying drawing:

Figure 1 shows a longitudinal section through the master cylinder and its relation to the pedal.

Figure 2 is a longitudinal section of a part of the assembly shown in Figure 1 but on a larger scale.

Figure 3 and Figure 4 are enlarged longitudinal sectional views of other parts of the assembly shown in Figure 1.

Figures 5 and 6 are perspective views of details.

Figure 7 is a view in longitudinal section through a novel wheel cylinder.

Referring by reference characters to the drawing, numeral 11 is used to designate a cylinder which extends through and is welded to a hollow bracket 13, the latter secured by fastening means 15 to a suitable plate 17. The plate 17 is fastened in any convenient way as at 19 to the underside of the toeboard of the passenger compartment of the vehicle. Registering openings at 23 and 25 in the plate 17 and the toeboard respectively, permit the passage therethrough of the cylinder 11. To the upper end of the cylindrical body 11 is threaded a bearing cap 27 through which reciprocates a piston, plunger or stem 29 terminating in a pad 31 adapted to be pushed by the operator. This member 31 constitutes both a plunger rod for the pad 31 and the piston for the master cylinder of the hydraulic brake system.

Coaxially arranged within the body 11 is a bearing assembly for the stem 29. This assembly includes a seamless steel tube 33 spaced from body 11 and surrounding a rubber bushing 35 moulded to the tubing. A ring 37 is welded to the end of tube 33 and is received between two gaskets 39 and 40 held in position by the engagement of the bearing cap 27 and the end of the body 11. Within the cap 27 is a hollow rubber seal 41. Its outer wall engages the cap and its inner wall engages the plunger 29. A spring 43 seated against the end of the bearing assembly, engages a seal expander 45. It may be said that the rubber tubular member 35 is intended to insure the co-axial relation of piston 29 and cylinder 11 and to provide for a noiseless reciprocation of the piston. The lower end of tube 33 extends axially beyond the rubber bearing 35 and as shown in Figure 5, its extreme end is formed with a plurality of recesses 47.

A reservoir 49 is located as shown in Figure 1, and is welded on the outside of the end of the body 11. It has a vented closure 51 at its upper end. A cylinder member 53, the master cylinder of the brake system, is received within the end of tubular body member 11 as best shown by Figure 2. Engaging the end of cylinder 53 is a spring seat 55. A retainer 57 in the form of a shallow cup engages the recessed end of the steel tube 33. Between the spring seat 55 and the retainer 57 is a rubber seal 59, this seal having an outer lip engaging the wall body 11 and an inner lip engaging the piston 29. An expander 61 is pushed against a rubber seal by a spring 63 having an abutment on the seat 55. The tubular body 11 has an opening 65 which affords communication between the reservoir and the space between parts 11 and 33. This opening is also radially opposite the recesses 47.

An internally threaded plug 67 is press-fitted within registering openings in body 11 and cylinder 53. A valve nut 69 is threaded into the plug 67. The nut is hollow and houses the valve stem 71. Within the nut, a washer 73 seats a spring 75 which engages a stem carried washer 77, the spring serving to hold the valve closed, its head 79 pressing against a rubber seal 81 surrounding the opening through the nut.

Contacting the seat 55 is the flared end 82 of a spring cage 83, the latter having a longitudinal slot 85. The piston 29 is reduced in diameter at a point near its end marked 87. Beyond the reduced portion of the piston is a radial stud 89 adapted to engage in the slot 85 and thereby prevent rotation of the piston relative to the cylinder. A spring 91 is seated in the end of the cage 83 around an opening 93 and its other end engages a shoulder 95 on the end of the piston 29.

At the end of the master cylinder 53 is a threaded closure 97 having a through passage for communication between the interior of the cylinder and the system of conduits represented by numeral 99 leading to the several wheel cylinders. A seal 101 seats against the closure 97 and a metallic cup 103 has a flange engaging the seal. A spring 105 is seated against the said flange at one end and extends through the master cylinder, its other end being in contact with the flared end 82 of cage 83. Within the cup 103 is a cup-shaped rubber valve resisting the passage of fluid from the cylinder to the conduit 99 but yieldable under applied pressure to move and open a passage such as 107.

When the pedal pressure is released, the piston 29 is retracted as shown in Figure 1. Fluid is then free to flow from within the master cylinder 53 through the reduced region 87 of the piston, through the recesses 47, and by way of opening 65 to the reservoir. In this relative position of parts, a reverse flow from the reservoir to the cylinder may also occur. When pressure is applied the movement of the plunger and piston 29 cuts off this communicating passage between the master cylinder and reservoir as will be apparent from an examination of Figure 2. The pressure developed in cylinder 53, due to the reduction in its capacity as the piston advances through the rubber seal 59, prevents any escape of fluid to the reservoir through the spring pressed valve 71. The fluid is then forced out through the valve mechanism at the end of the cylinder. It passes through the conduit system 99 and actuates the pistons of the several wheel cylinders as is usual in hydraulic brake systems. Springs 91 and 105 have lesser and greater resistance respectively and they act in succession. Spring 91 first yields and thereafter spring 105 affords yielding resistance. Since the two springs are arranged in series and in nested relation they serve to avoid the built up spring compression force which would occur in the case of a single spring and because of their assembly, one within the other, they make possible a relatively short master cylinder. Upon release of pedal pressure, the springs return the pistons to their initial position. As the piston returns the added capacity of cylinder 53 tends to produce suction in cylinder 53 since the springs operating to return the brake shoes are unable to restore the fluid to the master cylinder with sufficient rapidity to prevent such development of suction. The reduced pressure in cylinder 53 then permits a flow of fluid from the reservoir to the master cylinder through the valve 71. A flow of fluid from the reservoir through the passage 65 and the recesses 47 and the reduced region 87 of the piston may occur in the event that the flow from the reservoir through the one way valve 71 is insufficient to supply the master cylinder. Subsequently the returning fluid from the wheel cylinders and conduits 99 is restored to the reservoir by way of the reduced region 87 and the aperture 65.

Another advantage results from the use of the two springs. In certain brake systems, it is desirable to maintain a residual fluid pressure in conduit 99 of sufficient magnitude to prevent influx of air into the wheel cylinders and to keep their sealing members pressed tightly against their respective bores.

To maintain this residual pressure, a spring loaded valve as shown in Figure 4 is used, valve assembly 103 being held in place with a predetermined pressure by spring 105. If now pedal piston 29 is attached directly to the upper end of spring 105, the force with which this pedal is returned is definitely inter-related with the desired residual pressure in line 99. To separate the functions of the pedal return and the pressure maintaining means, two springs may be used as disclosed in this embodiment of the invention. As shown in Figure 1, spring 105 regulates the fluid pressure. The reaction of this being taken directly through the body of the master cylinder.

The small cage 83 holds the other spring 91, permitting the pedal pressure to be whatever is desired (provided it is less than the preload on spring 105). For example, if valve 103 has an effective area of 1 square inch and if the pressure we desire to maintain on line 99 is 12 pounds per square inch, spring 105 must press down valve 103 with a 12 pound force. Reaction on the other end of spring 105 is 12 pounds, which is substantially twice the force desired on pedal 29. In the construction disclosed, spring 91 then may be made, say 6 pounds, to give the desired pedal pressure.

From the above description it will be seen that two springs provide results which could not be obtained were only one spring used. If, as is described above the pedal rod 29 were directly attached to the upper end of the spring 105 and, as in the example stated above, 12 pound pressure upon the valve assembly 103 were necessary to overcome air leaks into the wheel cylinder, an initial pressure of 12 pounds would be required to be exerted by the operator upon the pedal 31 which would be very undesirable. However, where the brake pedal rod 29 is not directly connected to the upper end of the spring 105 this spring may be designed as in the present instance to exert the proper 12 pound initial force upon the valve assembly 103, while the second spring 91 maintains the pedal 31 in its normal position with a proper degree of force or pressure, for instance 6 pounds. Thus, only a 6 pound pressure need be exerted initially to operate the brake pedal and as soon as spring 91 is collapsed then and then only will the 12 pound pressure force be necessary to effect compression of the spring 105.

The drawing also shows non-rotatably mounted within master cylinder 53, a cylinder member 109. This member 109 is slotted as at 111. If it be desired the pin 89 of the piston may extend into this slot, thus serving to prevent the rotation of the piston. This arrangement may be adopted when a single spring only, such as spring 105, is used. Under these circumstances spring 91 and tube 35 will be omitted. Any convenient abutment may be provided for spring 105 on the piston 29. A suggested arrangement is a spring abutment mounted on the shoulder engaged by spring 91 shown in Figure 2.

At 113 is shown a brake drum carried by one of the vehicle wheels. Within the drum and secured at 115 to the fixed cover plate 117 is a central annular member 119 of a wheel cylinder. Oppositely directed cylindrical extensions 121 guide piston cups 123. The ends of the brake shoes 125 are moved into contact with the drum by a reciprocation of the piston cups 123 through the instrumentality of plungers 127. Rubber discs 129 are clamped between the central annulus 119 and flanges of the cylindrical extensions 121. These rubber discs engage the piston cups as shown. The adjacent faces of the annulus 119 and the flanges of the extensions 121 may be formed with annular grooves. These grooves grip the rubber firmly and prevent leakage when the cylindrical members 121 are secured to the annulus 119 by snap rings 131. When the fluid from the conduit 99 is forced into the space between the discs 129, the latter push the cups 123 and apply the brakes. Each rubber disc is formed with a circular thickened part 130. On the side of the disc adjacent the cup 123 the disc is formed with a circular slot 132 which extends from a region adjacent the line of contact between the piston and cylinder annularly into the thickened region 130. When the pressure is applied the central part of the disc, the part engaging the cup 123, advances and the pressure on the back of the rubber tends to close the slot. In consequence, a stretching of the rubber in the region adjacent its point of clamping is avoided. This construction also avoids the tendency to push the rubber between the relatively sliding parts. The rubber has a longer life and there is less danger of breaking the rubber inasmuch as it is under compression rather than in a stretched condition.

For the purpose of adjusting the clearance between the shoes and the drums, there is threaded on the plunger 127, a nut 133 secured to a cup-shaped member 135, the latter embracing the end of the cylinder. The nut has teeth 137 so that it may be rotated on the plunger. Since the latter cannot rotate because of its slotted end engagement with the web of the shoe at 139, the rotation of the nut reciprocates the shoe and changes the clearance between itself and the drum. At 141 is a detent element held to the central annulus by fastening means 143. The ends of the detent element engage notches in the cup member 135 to hold the parts in positions of adjustment. Numeral 145 shows an opening which may be used to bleed the cylinder.

I claim:

1. In hydraulic applying means, a cylinder, a seal in fixed relation therein, a plunger reciprocable through said seal, a reservoir secured to said cylinder adjacent said seal, a one-way valve opening from said reservoir to the high pressure side of the seal, a passage affording communication between the reservoir and the low pressure side of the seal, said plunger constructed to afford communication between the master cylinder and the passage in the retracted position of the plunger, said cylinder carrying a plunger guide on the low pressure side of the seal, and a plurality of successively operating springs on the high pressure side of the plunger, said springs successively resisting the depression of the plunger.

2. In hydraulic applying means, a cylinder, a seal in fixed relation therein, a plunger reciprocable through said seal, a reservoir secured to said cylinder adjacent said seal, a one-way valve opening from said reservoir to the high pressure side of the seal, a passage affording communication between the reservoir and the low pressure side of the seal, said plunger constructed to afford communication between the master cylinder and the passage in the retracted position of the plunger, said cylinder carrying a plunger guide in the form of a cylinder rubber member, a plurality of successively operating springs on the high pressure side of the plunger, said springs yielding successively to prevent excessive spring compression force at the end of the stroke of the plunger.

3. In hydraulic applying means, a cylinder, a seal in fixed relation therein, a plunger reciprocable through said seal, a reservoir secured to said cylinder adjacent said seal, a one-way valve opening from said reservoir to the high pressure side of the seal, a passage affording communication between the reservoir and the low pressure side of the seal, said plunger constructed to afford communication between the master cylinder and the passage in the retracted position of the plunger, said plunger construction including a reduced portion movable through said seal.

4. In hydraulic applying means, a cylinder, a seal in fixed relation therein, a plunger reciprocable through said seal, a reservoir secured to said cylinder adjacent said seal, a one-way valve opening from said reservoir to the high pressure side of the seal, a passage affording communication between the reservoir and the low pressure side of the seal, said plunger constructed to afford communication between the master cylinder and the passage in the retracted position of the plunger, said plunger construction including a reduced portion movable through said seal, and an extremity formed with a radial pin, said cylinder having therewithin slotted means to engage said pin.

OLAF RASMUSSEN.